June 12, 1951     C. A. PIERSON     2,556,597
OVEN VENT
Filed Dec. 5, 1945
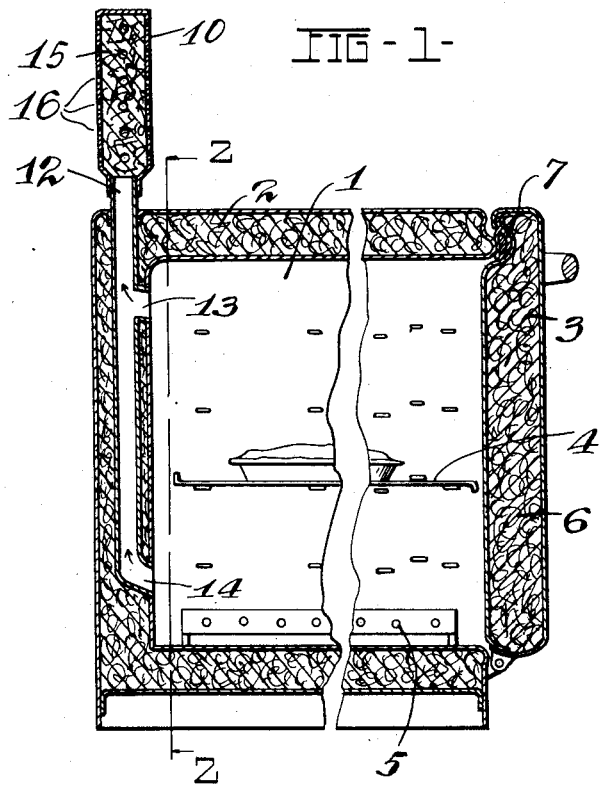
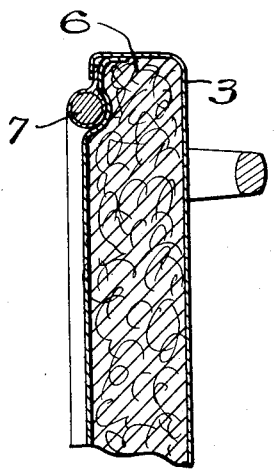
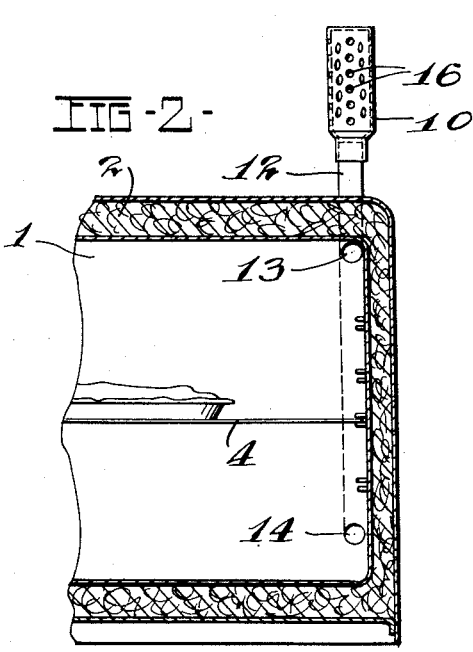
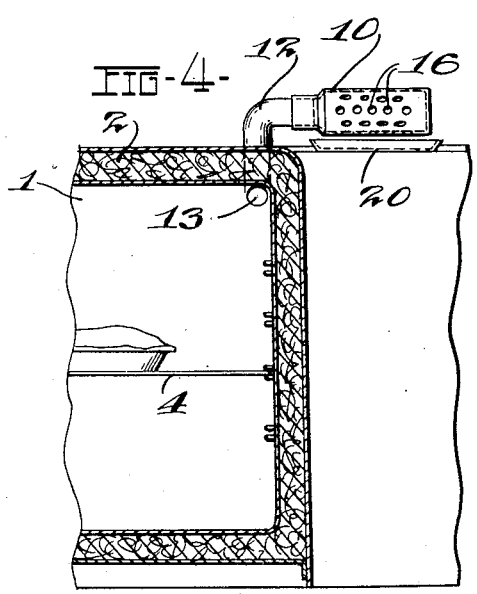
Inventor
CHARLES A. PIERSON
By Owen & Owen
Attorneys Patented June 12, 1951

2,556,597

UNITED STATES PATENT OFFICE 2,556,597

OVEN VENT

Charles A. Pierson, Maumee, Ohio

Application December 5, 1945, Serial No. 632,903

1 Claim. (Cl. 219—35)

This invention relates to means for venting ovens and is particularly directed to an apparatus to control the flow of moisture-laden air from an electrically heated oven.

The primary object of the invention is to provide means to control air and moisture flowing to the surrounding atmosphere from an electrically heated oven.

Another object of the invention is to provide means to condense and return, if desired, moisture extracted from the oven and its contents during operation.

Other objects and advantages of the invention will become apparent from the following specification, reference being had to the accompanying drawing in which Fig. 1 is a diagrammatic cross section of an oven embodying the present invention;

Fig. 2 is a section on line 2—2 of Fig. 1;

Fig. 3 is a diagrammatic, detailed cross sectional view of a door which cooperates to close the oven structure shown in Fig. 1; and Fig. 4 is a view similar to Fig. 2 showing a modified form of the apparatus.

Referring to the drawings, and particularly to Fig. 1, the invention is shown applied to an oven the interior 1 of which is surrounded by the usual insulated top, bottom and side walls 2, with the front of the oven opening closed by a door 3. Food racks 4 are disposed within the oven in the usual manner and a heating element 5, which may be of any suitable electrically energized type, is located at the bottom of the interior of the oven.

Referring to Fig. 3, it will be noted that the door 3 contains a mass of insulation 6, and is further provided with a surrounding gasket 7, which cooperates with the face of the oven structure to seal the door opening whenever the door is closed. Sealing structures of this type form no part of the present invention and any substantially complete, air-tight seal for the oven opening may be used.

In baking or roasting foods, it is desirable that the air flow through the oven interior be controlled so that the moisture content of the food in the oven be not reduced excessively. If the moisture content is reduced, shrinkage of roasted meats and uneven browning of baked goods will result. Some air flow out of the oven is necessary because of the expansion of the air during its heating and because of the volatilization and expansion of the materials within the foods being cooked. It is, therefore, desirable to provide a vent for the oven and this, in the past, has taken the form of substantially non-adjustable, plain openings in a part of the oven wall. In the absence of even such a crude vent, the products of the cooking operation will pass out around the door of the oven and condense on the stove front, causing a greasy smear on that surface. With such a vent the moisture laden air condenses on adjacent walls, smearing these, and the air flow is so irregular that improper baking and roasting results. The present invention overcomes these disadvantages by providing a vent in which the air flow is controlled, and moisture extracted from the air and deposited either in a drip pan provided for that purpose or returned to the oven.

In the form shown in Fig. 2, the vent comprises an elongated cylindrical body 10, which is connected to the upper part of the oven interior by a pipe 12 which opens into the oven in an opening 13. In this form the pipe 12 is continued to the bottom of the oven where it communicates again with the interior through an opening 14. The interior of the cylindrical body 10 is filled with a mass of non-oxidizing wool material such as aluminum wool, the mass being designated 15 and the side walls of the body are perforated with a series of spaced openings 16. By controlling the density of the aluminum wool packing, it will be apparent that any desired resistance to the flow of gases through the openings 16 may be set up.

The operation of the vent shown in Figs. 1 and 2 will be apparent from an inspection of the drawings wherein it will be seen that air and fumes passing from the interior of the oven 1 through the opening 13 will be condensed on the relatively cool surface presented by the mass of aluminum wool 15, and the air thus dried will pass out of the body 10 through the openings 16. It has been found that the air is substantially odorless and sufficiently relieved of its moisture that no condensation takes place on surfaces standing at room temperature. The moisture trapped in the aluminum wool will return to the oven by dripping down the length of the pipe 12 and re-entering through opening 14. It is, of course, presumed that the resistance to flow through the openings 16 is less than the resistance created by the gasket 7 in sealing the front opening of the oven.

In the modified form shown in Fig. 4, no provision is made for the return of condensed moisture since the oven vent is disposed laterally with respect to the oven. A drip pan 20 which may be an integral part of the range in which the oven is used, catches whatever condensed moisture drips through the opening 16 in the vent. This modification has the advantage of compactness and, in installations in which moisture return is not a compelling factor, is equally as effective as the form shown in Figures 1 and 2.

While the invention has been shown in its preferred embodiments, it will be appreciated that other modifications and changes will suggest themselves to those skilled in the art and that such modifications and changes may be made without departing from the invention as defined in the appended claim.

What I claim is:

In combination with an electric range including an oven normally sealed from the atmosphere except for a conduit, means for insulating the oven, a door for permitting entrance into the oven, and electric heating means located in the oven, a vertically disposed conduit adjacent the oven having the lower end in open communication with the lower part of the oven, means providing open communication of the upper part of the oven with the conduit, a hollow perforate member attached to and covering the upper end of the conduit, and a non-oxidizing wool material packed into the interior of the perforate member in such a manner that the resistance to flow through the perforate member is less than but approximates that of the oven door, thus causing the perforate member and packing material to act as a condenser for condensing water vapor and returning the condensate to the oven through the lower end of the conduit.

CHARLES A. PIERSON.

REFERENCES CITED

The following references are of record in the file of this patent:

UNITED STATES PATENTS

| Number | Name | Date |
|---|---|---|
| 1,192,078 | Laberge | July 25, 1916 |
| 1,450,951 | Cruyt | Apr. 10, 1923 |
| 1,453,665 | Foll | May 1, 1923 |
| 2,051,710 | Hentschel | Aug. 18, 1936 |

FOREIGN PATENTS

| Number | Country | Date |
|---|---|---|
| 237,665 | Great Britain | Aug. 6, 1925 |
| 533,223 | Great Britain | Feb. 10, 1941 |